United States Patent
Beller et al.

(10) Patent No.: US 10,601,855 B2
(45) Date of Patent: Mar. 24, 2020

(54) SOURCE VERIFICATION DEVICE

(71) Applicant: INTERNATIONAL BUSINESS MACHINES CORPORATION, Armonk, NY (US)

(72) Inventors: Charles E. Beller, Baltimore, MD (US); Gregory J. Boss, Saginaw, MI (US); Christopher L. Molloy, Raleigh, NC (US); Bernadette A. Pierson, South Hero, VT (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 114 days.

(21) Appl. No.: 15/610,886

(22) Filed: Jun. 1, 2017

(65) Prior Publication Data

US 2018/0351985 A1 Dec. 6, 2018

(51) Int. Cl.
*H04L 29/06* (2006.01)
*H04W 12/00* (2009.01)
*H04M 3/51* (2006.01)

(52) U.S. Cl.
CPC ........ *H04L 63/1433* (2013.01); *H04L 63/126* (2013.01); *H04W 12/00503* (2019.01); *H04W 12/00506* (2019.01); *H04L 63/12* (2013.01); *H04M 3/5116* (2013.01)

(58) Field of Classification Search
CPC ... H04L 63/12; H04L 63/126; H04L 63/1433; H04W 12/00; H04W 12/00503; H04W 12/00506; H04M 3/5116
See application file for complete search history.

(56) References Cited

U.S. PATENT DOCUMENTS

| 7,181,196 | B2 | 2/2007 | Patel | |
| 8,175,225 | B2* | 5/2012 | Buscemi | H04M 3/4874 379/37 |
| 8,549,622 | B2 | 10/2013 | Byrne et al. | |
| 8,983,047 | B2* | 3/2015 | Ehrlich | H04W 4/90 379/142.06 |

(Continued)

FOREIGN PATENT DOCUMENTS

WO 2015/030897 3/2015

OTHER PUBLICATIONS

List of IBM Patents or Patent Applications Treated as Related, dated Dec. 13, 2019, 1 page.

(Continued)

*Primary Examiner* — Linglan E Edwards
(74) *Attorney, Agent, or Firm* — Jay Wahlquist; Andrew D. Wright; Roberts Mlotkowski Safran Cole & Calderon, P.C.

(57) ABSTRACT

Systems and methods for source verification are disclosed. A method includes: receiving, by a computing device, a report from a first source; determining, by the computing device, the first source is listed in a source repository based on receiving the report; selecting, by the computing device, a second source at a location remote from the first source based on the source being listed in the source repository; confirming, by the computing device, the report from the first source based on information received from the second source; repeating, by the computing device, the selecting and the confirming until a value of information in the report from the second source exceeds an information trust level value for the report.

14 Claims, 4 Drawing Sheets

(56) References Cited

U.S. PATENT DOCUMENTS

| | | | |
|---|---|---|---|
| 9,177,014 B2 | 11/2015 | Gross | |
| 9,280,684 B1 | 3/2016 | Kragh | |
| 9,294,497 B1* | 3/2016 | Ben-Or | H04L 63/1433 |
| 9,307,078 B2* | 4/2016 | Ehrlich | H04W 4/90 |
| 9,313,637 B2* | 4/2016 | Mitchell, Jr. | H04W 4/90 |
| 9,386,108 B1 | 7/2016 | Waite et al. | |
| 9,794,755 B1* | 10/2017 | South | H04W 4/04 |
| 9,936,526 B2* | 4/2018 | Edge | H04W 4/90 |
| 9,986,404 B2* | 5/2018 | Mehta | H04W 4/90 |
| 10,122,659 B1* | 11/2018 | Sumner | H04L 51/046 |
| 2003/0093680 A1 | 5/2003 | Astley et al. | |
| 2006/0161967 A1* | 7/2006 | Dawson | H04L 63/126 |
| | | | 726/2 |
| 2010/0003952 A1* | 1/2010 | Ray | G10L 13/043 |
| | | | 455/404.1 |
| 2015/0379834 A1 | 12/2015 | Datta et al. | |
| 2016/0173687 A1* | 6/2016 | Ehrlich | H04W 4/90 |
| | | | 379/45 |
| 2017/0251347 A1* | 8/2017 | Mehta | H04W 4/90 |

OTHER PUBLICATIONS

Specification "Source Verification Device" and Drawings in Application No. 16/692,552 filed Nov. 22, 2019, 40 pages.

\* cited by examiner

SOURCE VERIFICATION DEVICE

BACKGROUND

The present invention relates generally to verification of sources and, more particularly, to a system and method for verification of reports from sources during an emergency situation.

During an occurrence of an emergency, information about the emergency is reported to first responders from multiple sources and from multiple locations. Though many sources may not intend to misrepresent the information about the emergency, the sources may not always be accurate in their reporting. Inaccurate information about the emergency from these sources may impede resolution of the emergency.

Additionally, social networks and other media channels are occasionally used to send information to first responders. Inaccurate information received via the channels may lead the first responders away from the emergency. Currently, verification of sources and the information from the sources is complex process that expends valuable resources that may be better utilized in attending to the actual emergency.

SUMMARY

In an aspect of the invention, a computer implemented method includes receiving, by a computing device, a report from a first source; determining, by the computing device, the first source is listed in a source repository based on receiving the report; selecting, by the computing device, a second source at a location remote from the first source based on the source being listed in the source repository; confirming, by the computing device, the report from the first source based on information received from the second source; repeating, by the computing device, the selecting and the confirming until a value of information in the report from the second source exceeds an information trust level value for the report.

In another aspect of the invention, a computer program product comprises a computer readable storage medium having program instructions embodied therewith receive a report from a first user device of a first source; assign an information trust level value to the report from the first source based on receiving the report; select a second user device of a second source at a location remote from the user device of the first source based on assigning the information trust level value to the report from the first source; assign an information value to information from the second source based on receiving information from the second source; confirm the report with the second user device of the second source based on determining the information value exceeds the information trust level value.

In another aspect of the invention, there is a system for verification of reports from sources. The system includes: a CPU, a computer readable memory and a computer readable storage medium associated with a mobile computer device program instructions to receive a report from an unknown source at a location; program instructions to determine other unknown sources near the location; program instructions to select a second unknown source from the other unknown sources; program instructions to determine whether information from the second unknown source exceeds an information trust level value; and program instructions to repeat the selecting until information from a number of unknown sources exceeds the information trust level value. The program instructions are stored on the computer readable storage medium for execution by the CPU via the computer readable memory.

BRIEF DESCRIPTION OF THE DRAWINGS

The present invention is described in the detailed description which follows, in reference to the noted plurality of drawings by way of non-limiting examples of exemplary embodiments of the present invention.

DETAILED DESCRIPTION

The present invention relates generally to verification of sources and, more particularly, to a system and method for verification of reports from sources during an emergency situation. In aspects, the present invention provides a mechanism for verifying the information reported from a source. For example, a source may utilize a user device (e.g., a radio dispatch, a mobile phone, etc.) to communicate information about emergencies. A source may be an individual (e.g., a public safety officer or a bystander) utilizing a user device to report emergencies at specific locations so that first responders may be dispatched to the location of the emergency. However, the source may not always be reliable.

In aspects, the preset invention receives a report from the source at a location (e.g., street address) and determines a trust level of the source (e.g., whether the report is from a trusted source, an untrusted source, or an unknown source). In aspects, the present invention determines other sources nearby the location of the source if the source trust level and information from the source fails to meet certain criteria.

In aspects, the present invention selects a second source at a location remote from a first source and confirms the report with the second source. In aspects, the second source is within a radius of the location of the first source. In aspects, the selecting and the confirming are repeated until a sufficient number of sources confirm the report (e.g., the report is confirmed by multiple sources and the information in the report exceeds an information trust level value). In aspects, after confirming the report, the report is considered verified and first responders are dispatched to the location of the emergency.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
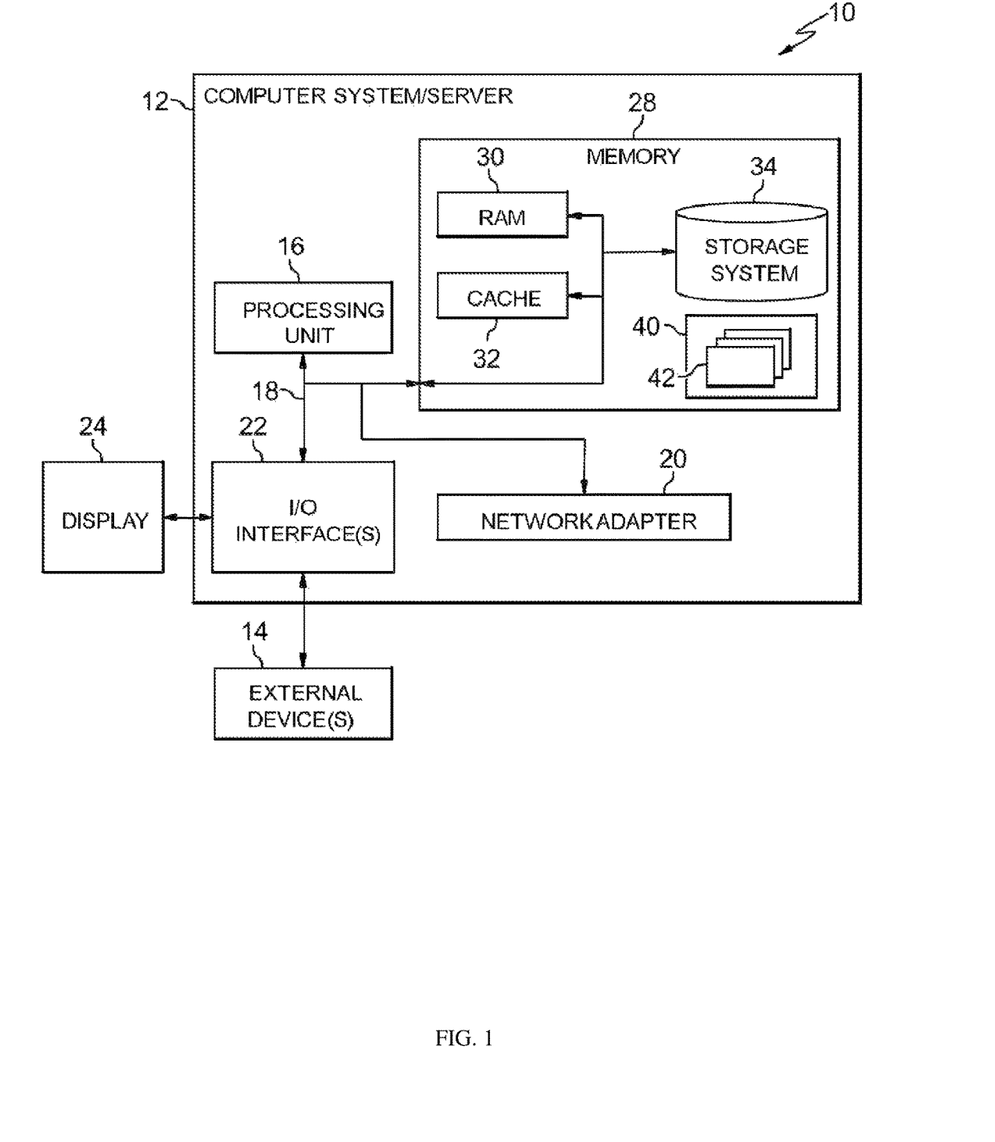
FIG. 1 depicts a computing infrastructure according to an embodiment of the present invention.

Referring now to FIG. 1, a schematic of an example of a computing infrastructure is shown. Computing infrastructure 10 is only one example of a suitable computing infrastructure and is not intended to suggest any limitation as to the scope of use or functionality of embodiments of the invention described herein. Regardless, computing infrastructure 10 is capable of being implemented and/or performing any of the functionality set forth hereinabove.

In computing infrastructure 10 there is a computer system (or server) 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 may be described in the general context of computer system executable instructions, such as program modules, being executed by a computer system. Generally, program modules may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system 12 in computing infrastructure 10 is shown in the form of a general-purpose computing device. The components of computer system 12 may include, but are not limited to, one or more processors or processing units (e.g., CPU) 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a nonremovable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18. It should be understood that although not shown, other hardware and/or software components could be used in conjunction with computer system 12. Examples, include, but are not limited to: microcode, device drivers, redundant processing units, external disk drive arrays, RAID systems, tape drives, and data archival storage systems, etc.

Figure 2:
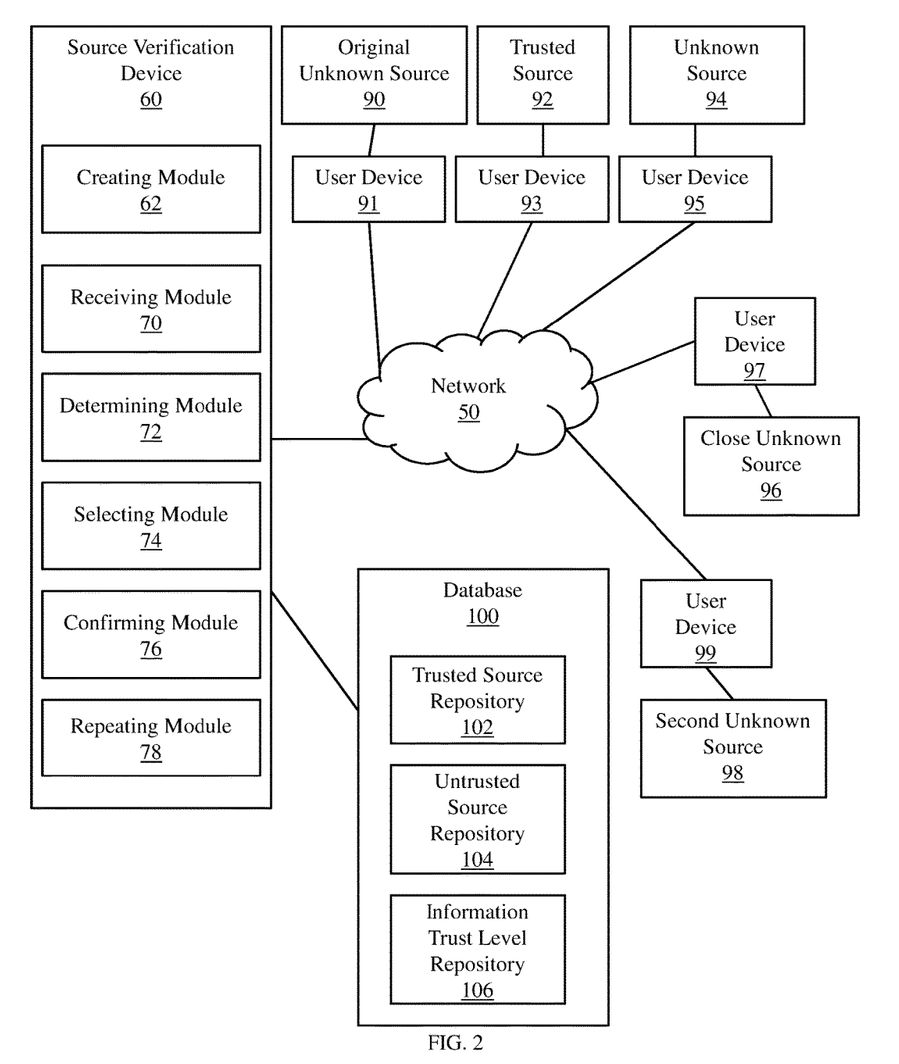
FIG. 2 shows an exemplary environment in accordance with aspects of the invention.

FIG. 2 shows an exemplary environment in accordance with aspects of the invention. Currently, a source (e.g., a public safety officer or a bystander) utilizes a user device (e.g., a radio dispatch, a mobile phone, etc.) to communicate information about emergencies to a first responder dispatching device. Though the information may be correct, verification of the source expends valuable resources that may be better utilized in attending to an actual emergency.

For example, when an emergency situation takes place and is reported by an individual near the location of the emergency situation, verification of the report is based on a trust level of the individual reporting the emergency situation. By way of example, if the source (e.g., a reporting individual) is a public safety officer, then the likelihood of the emergency situation taking place at the reported location is high as the trust level of the public safety officer is high. In another example, if the source (e.g., the reporting individual) is a civilian, then the likelihood of the emergency situation taking place at the reported location may be medium (e.g., where the reporting individual is a bystander) or may be low (e.g., where the reporting individual is a known untrusted source). In aspects, the present invention provides a mechanism for verifying a trust level of a source and verifying the information reported by the source, thereby reducing wasted expenditure of resources.

Referring to FIG. 2, the exemplary environment includes a source verification device 60 which may comprise a computer system 12 of FIG. 1, and may be connected to a network 50 (e.g., via the network adapter 20 of FIG. 1). The network 50 may be any suitable communication network or combination of networks, such as a local area network (LAN), a general wide area network (WAN), a public network (e.g., the Internet), a 3G network, a Long-Term Evolution (LTE) network, and/or a 5G network.

The source verification device 60 may comprise a plurality of modules configured to perform one or more functions described herein. In aspects, the source verification device 60 may include additional or fewer modules than those shown in FIG. 2. In aspects, separate components may be integrated into a single computing component or module. Additionally, or alternatively, a single module may be implemented as multiple computing components or modules (e.g., program modules 42 of FIG. 1).

In embodiments, the source verification device 60 includes a creating module 62, a receiving module 70, a determining module 72, a selecting module 74, a confirming module 76, and a repeating module 78. The source verification device 60 is configured for communication via the network 50 with one or more of an original unknown source 90, a trusted source 92, an unknown source 94, a close unknown source 96, a second unknown source 98, and a database 100. In aspects, the database includes a trusted source repository 102, an untrusted source repository 104, and an information trust level repository 106 used by the source verification device 60. In aspects, the trusted source repository 102, the untrusted source repository 104, and the information trust level repository 106 is used by the source verification device 60 in verifying the reports from the original unknown source 90, the trusted source 92, the unknown source 94, the close unknown source 96, and the second unknown source 98.

In aspects, the creating module 62 creates the trusted source repository 102, the untrusted source repository 104, and the information trust level repository 106. The trusted source repository 102 contains a list of trusted sources such as first responders, public safety officials, and trusted family members. For example, medical professional (e.g., nurses, doctors, and emergency medical technicians (EMT), etc.) in a given area (e.g., a town or a municipality) may be registered (e.g., by auto registration) in the trusted source repository 102 as trusted sources. Individuals in a town who pay utility bills to the town may also be listed in the trusted source repository 102 as trusted sources.

The untrusted source repository 104 contains a list of individuals who are not trusted to accurately report emergencies. For example, individuals who are known to prank call emergency dispatch personnel (e.g., 911 dispatchers) and report false emergencies may be registered (e.g., by auto registration) in the untrusted source repository 104 as untrusted sources. In another example, unknown sources may be registered in the untrusted source repository 104 as untrusted sources when information from the unknown sources is constantly contradicted by trusted sources (e.g., during and after the process of verifying information in a report from the original unknown source 90).

The information trust level repository 106 includes an information trust level value for different types of reports. The information trust level value is a value based on a type of report and profile information for the type of report. The information trust level may also be utilized as a guide when dispatching personnel to the location of the emergency.

For example, if an EMT in an ambulance receive multiple emergency calls for emergencies at different locations, the information trust level value of the information in the emergency calls becomes critical in determining which location to dispatch the EMT (e.g., the correct location to dispatch the EMT). In another example, if the EMT in the ambulance is sitting idle, the information trust level value for a report may be ignored and the EMT is dispatched to the location of the emergency for precautionary purposes. In this case, the EMT may be viewed as a second source (e.g., the trusted source 92 registered in the trusted source repository 102) that confirms the information in the report from the original unknown source 90 is accurate.

In aspects, the source verification device 60 receives a report (e.g., an emergency situation) from a source via a user device. The report includes information such as, for example: a type of report, a location of the report, and a profile information of the report. The type of report may include, but is not limited to, a medical report, a crime report, or a public safety announcement, etc. The location of the report of the report may include, but is not limited to, a hospital, a street address, or a neighborhood, etc. The profile information of the report may include, but is not limited to, a heart attack, lost person, or a weather advisory, etc.

By way of example, the original unknown source 90 utilizes user device 91 to transmit the report to the source verification device 60 over the network 50. Similarly, the trusted source 92, the unknown source 94, the close unknown source 96, and the second unknown source 98 utilize user devices 93, 95, 97, and 99, respectively, to transmit their respective reports to the source verification device 60 over the network 50.

In aspects, based on receiving the report from the source, the source verification device 60 determines whether the source is listed in the trusted source repository 102 or the untrusted source repository 104. In aspects, the source verification device 60 accesses the database 100 to determine whether the source is listed in the trusted source repository 102 or the untrusted source repository 104. If the source is listed in the trusted source repository 102, the source verification device 60 dispatches emergency personnel to the location of in the report. If the source is listed in the untrusted source repository 104, the source verification device 60 attempts to select a trusted source near the location of the emergency to confirm that the emergency is occurring at the location provided by the source.

If the source is not listed in the trusted source repository 102 or the untrusted source repository 104, the source verification device 60 accesses the information trust level repository 106 and determines an information trust level value for the report (e.g., as defined by the type of report and profile information for the type of report).

For example, if the type of report is a report of a medical emergency and the profile for the report is a profile of a heart attack, then the information trust level value is a low numerical value (e.g., a value of 2 in numerical scale from 1 to 10). In another example, if the type of report is a report of property damage and the profile for the report is a profile of damage to a sign, then the information trust level value is a high numerical value (e.g., a value of 9 in numerical scale from 1 to 10). Implementations are not limited to these types and profiles and other types and profiles may be used.

In aspects, based on determining the information trust level value for the report, the information trust level value for the report selects a second source (e.g., the trusted source 92, the unknown source 94) and confirms the report with the second source. The information from the second source is assigned a value (e.g., as defined by the type of report, the location of the report, profile information for the type of report, size of the emergency in the report, and number of people affected by the emergency in the report, etc.). If the value determined for the information in the report from the second source exceeds an information trust level value for the report, the source verification device 60 dispatches emergency personnel to the location in the report.

If the value determined for the information in the report from the second source does not exceed the information trust level value, the source verification device 60 selects another source and attempts to confirm the report provided by the original source. In aspects, the source verification device 60 repeats the selecting and the confirming until an aggregate value determined for the information in the report from the source exceeds the information trust level value.

In a first example, the receiving module 70 receives a report from the trusted source 92 via the user device 93. For example, the trusted source 92 (e.g., a public safety officer) may report emergencies (e.g., an emergency situation at a location) to the receiving module 70 of the source verification device 60 over the network 50 via the user device 93.

In aspects, based on receiving the report from the trusted source 92, the determining module 72 determines whether the trusted source 92 is in the trusted source repository 102 of the database 100. In aspects, if the trusted source 92 is listed in the trusted source repository 102, the report is considered as verified and emergency personnel are dispatched to the location of the emergency in the report. For example, after the determining module 72 determines that the trusted source 92 is listed in the trusted source repository 102 as a public safety officer, emergency personnel are dispatched to the location of the emergency reported.

In another example, the receiving module 70 receives a report from the original unknown source 90 via the user device 91. For example, the original unknown source 90 may report emergencies (e.g., type, location, and profile information of the emergency) to the receiving module 70 of the source verification device 60 over the network 50 via the user device 91.

In aspects, based on receiving the report from the original unknown source 90, the determining module 72 determines whether the original unknown source 90 is in the trusted source repository 102 of the database 100 or the untrusted source repository 104 of the database 100. In aspects, the determining module 72 determines whether information in the report contains identifying information for the original unknown source 90 (e.g., public safety office identification number or identification of a satire website). If the original unknown source 90 is in the trusted source repository 102 (e.g., listed in the trusted source repository 102 as a public safety officer), the report is considered as verified and emergency personnel are dispatched to the location of the emergency.

If the original unknown source 90 is in the untrusted source repository 104 (e.g., listed in the untrusted source repository 104 as a known untrusted source), the determining module 72 determines the location of the emergency in the report. In aspects, based on determining the location of the emergency, the determining module 72 determines whether a trusted source from the trusted source repository 102 has reported a similar emergency (e.g., a trusted source 92 reporting a similar emergency at a similar location).

If the original unknown source 90 is in the untrusted source repository 104 and a trusted source 92 is reporting a similar emergency, the report is considered as verified and emergency personnel are dispatched to the location of the emergency. For example, after the determining module 72 determines that a public safety officer listed in the trusted source repository 102 is reporting a similar emergency at a similar location reported by the known untrusted source, emergency personnel are dispatched to the location of the emergency.

In aspects, if the original unknown source 90 is in the untrusted source repository 104 and no trusted source has reported a similar emergency, the report is discounted and no emergency personnel are dispatched. For example, after the determining module 72 determines that no public safety officer listed in the trusted source repository 102 is reporting a similar emergency at a similar location reported by the known untrusted source, the report is discounted and no emergency personnel are dispatched.

In aspects, if the original unknown source 90 is not in the trusted source repository 102 or the untrusted source repository 104, the determining module 72 determines the location of the emergency. For example, after the determining module 72 determines that the original unknown source 90 (e.g., a bystander) is not listed in the trusted source repository 102 or the untrusted source repository 104, the determining module 72 determines the location of the emergency reported by the bystander.

In aspects, based on determining the location of the emergency, the determining module 72 determines whether a trusted source (e.g., a trusted source 92) from the trusted source repository 102 is close to the location of the emergency in the report. In aspects, if the trusted source 92 is close to the location of the emergency, the selecting module 74 selects the trusted source 92 for confirmation of the report. For example, after the determining module 72 determines that a public safety officer listed in the trusted source repository 102 is close to the location of the emergency, the selecting module 74 selects the public safety officer for confirmation of the report.

In aspects, based on selecting the trusted source 92, the confirming module 76 confirms the report with the trusted source 92 by contacting the trusted source 92 via the user device 93 to obtain: an automatic verification of the report (e.g., where the trusted source 92 sends a confirmation acknowledgement via the user device 93 to the source verification device 60 verifying the report prior to moving to the location of the emergency) or a formal verification of the report (e.g., having the trusted source 92 move to location of the emergency and sending a confirmation acknowledgement via the user device 93 verifying the report).

For example, after the selecting module 74 selects the public safety officer, the confirming module 76 confirms the report with the public safety officer if the public safety officer sends a confirmation acknowledgement to the source verification device 60 or by having the public safety officer relocate to location of the report and then send the confirmation acknowledgement to the source verification device 60.

In aspects, based on confirming the report, the report is considered as verified and emergency personnel are dispatched. For example, the confirming module 76 confirms the report with the public safety officer when the public safety officer send a confirmation acknowledgement to the source verification device 60, emergency personnel are dispatched to the location of the emergency.

In aspects, if there is no trusted source close to location of the emergency, the determining module 72 determines an information trust level value (e.g., where the information trust level value is defined by the type of report and the profile information of the report) for the report from the original unknown source 90 by accessing the information trust level repository 106 in database 100. The information trust level repository 106 predefine an information trust level values based on a combination of the type of report and the profile information of the report. In aspects, the information trust level repository 106 contains a list of separate information trust level values for different combinations of the type of report and profile information of the report.

By way of example, if the report from the bystander is a report of a heart attack, the determining module 72 accesses the information trust level repository 106 to determine the information trust level value is a low numerical value (e.g., a value of 2 in a numerical scale from 1 to 10) for a report of a heart attack. In another example, if the report from the bystander is a report of a paper cut, the determining module 72 accesses the information trust level repository 106 to determine the information trust level value is a high numerical value (e.g., a value of 9 in a numerical scale from 1 to 10).

In aspects, based on determining the information trust level value for the report, the selecting module 74 selects an unknown source (e.g., the unknown source 94) at a location remote from the original unknown source 90. For example, based on determining the report from the bystander is a report of a heart attack, the selecting module 74 selects the unknown source 94 at a location remote from the bystander.

In aspects, prior to selecting the unknown source 94 the selecting module 74 determines that the unknown source 94 does not have a social connection (e.g., same call history, phone numbers, social network contacts) with the original unknown source 90 and uses physical proximity to select the unknown source 94. If the call history is similar, the selecting module 74 does not select the unknown source 94. If the call history is dissimilar, the selecting module 74 may select the unknown source 94 using physical proximity to the unknown source 94. In this manner, the selecting module 74 reduces the likelihood of malicious collusion (e.g., multiple false reports of an emergency from colluding sources).

In aspects, based on checking the social connection between the original unknown source 90 and the unknown source 94, the selecting module 74 selects an area (e.g., a circle with a predefined radius) around the original unknown source 90 and selects another unknown source that is farthest from the original unknown source 90 but within the selected area around the original unknown source 90. For example, though the close unknown source 96 may be within the selected area around the original unknown source 90 and be considered part of the pool of unknown sources from which the selecting module 74 may select, the selecting module 74 selects the unknown source 94 based on the unknown source 94 being farther away from the original unknown source 90 as compared to the close unknown source 96. By not selecting the close unknown source 96, the selecting module 74 avoids selecting close associates to the original unknown source 90 as those associates may be more likely to provide false information.

Based on selecting the unknown source 94, the confirming module 76 confirms the report with the unknown source 94 via the user device 95. For example, the confirming module 76 may: access the social network of the unknown source 94 to verify that the report from the original unknown source 90 is accurate (e.g., automatic verification) or have the unknown source 94 move to location of the emergency and verify the report (e.g., formal verification).

In aspects, based on confirming the report with the unknown source 94 via the user device 95, the confirming module 76 assigns a value (e.g., a numerical value from 1 to 10) to the information in the report from the unknown source 94. The value assigned to the information in the report is defined by the type of report, the location of the report, and the profile of the report. For example, if the report only has the type and location of the report, the value assigned to the report would assigned a lower numerical value (e.g., a numerical value of 2 in a numerical scale of 1 to 10). If the report had the type of report, the location of the report, and the profile of the report, the value assigned to the report would assigned a higher numerical value (e.g., a numerical value of 9 in a numerical scale of 1 to 10) In aspects, other information (e.g., size of the emergency in the report, number of people affected by the emergency in the report, etc.) in the report may be used to assign a numerical value to the report.

In aspects, the confirming module 76 determines the value of the information in the report (e.g., the numerical value of the information in the report) exceeds the information trust level value (e.g., the numerical value of the information trust level) determined by the determining module 72. In aspects, if the value of the information in the report exceeds the information trust level value for the report, the report from the original unknown source 90 is considered as verified by the unknown source 94 and emergency personnel are dispatched.

If the value of the information (e.g., a information value based on the type of report, the location of the report, profile information for the type of report, size of the emergency in the report, and number of people affected by the emergency in the report) in the report from the unknown source 94 does not exceed the information trust level value for the report, the selecting module 74 selects an area around the unknown source 94 and selects a second unknown source that is farthest from the unknown source 94 within the area.

Based on based on selecting a second unknown source (e.g., the second unknown source 98), the confirming module 76 confirms the report from the original unknown source 90 by: contacting the second unknown source 98 via the user device 99, confirming the report with the second unknown source 98, and assigning a value to the information (e.g., a second information value based on the type of report, the location of the report, profile information for the type of report, size of the emergency in the report, and number of people affected by the emergency in the report) from the second unknown source 98.

In aspects, the confirming module 76 sums the value assigned to the information in the report by the second unknown source 98 (e.g., the numerical value of the information in the report from the unknown source 98) with the value assigned to the information in the report by the unknown source 94 (e.g., the numerical value of the information in the report from the unknown source 94) and confirms that an aggregate value of the information from the unknown source 94 and the second unknown source 98 exceeds the information trust level value. The value assigned to the information in the report by the second unknown source 98 may be less than the value assigned to the information in the report by the unknown source 94 as the proximity between the location of the original unknown source 90 and the second unknown source 98 has increased.

If the aggregate value of the information from the unknown source 94 and the second unknown source 98 (e.g., the numerical value of the information in the report from the unknown source 94 plus the numerical value of the information in the report from the unknown source 98) exceeds the information trust level value of the report from the original source 90 (e.g., the numerical value of the information trust level for the report from the original source 90), the report from the original unknown source 90 is considered as verified and emergency personnel are dispatched.

If the aggregate value of the information from the unknown source 94 and the second unknown source 98 (e.g., the numerical value of the information in the report from the unknown source 94 plus the numerical value of the information in the report from the unknown source 98) does not exceed the information trust level value of the report from the original source 90 (e.g., the numerical value of the information trust level for the report from the original source 90), the repeating module 78 repeats the actions by the selecting module 74 and the confirming module 76 until the aggregate value of the information from other sources exceeds the information trust level value of the report from the original source 90.

Figure 3:
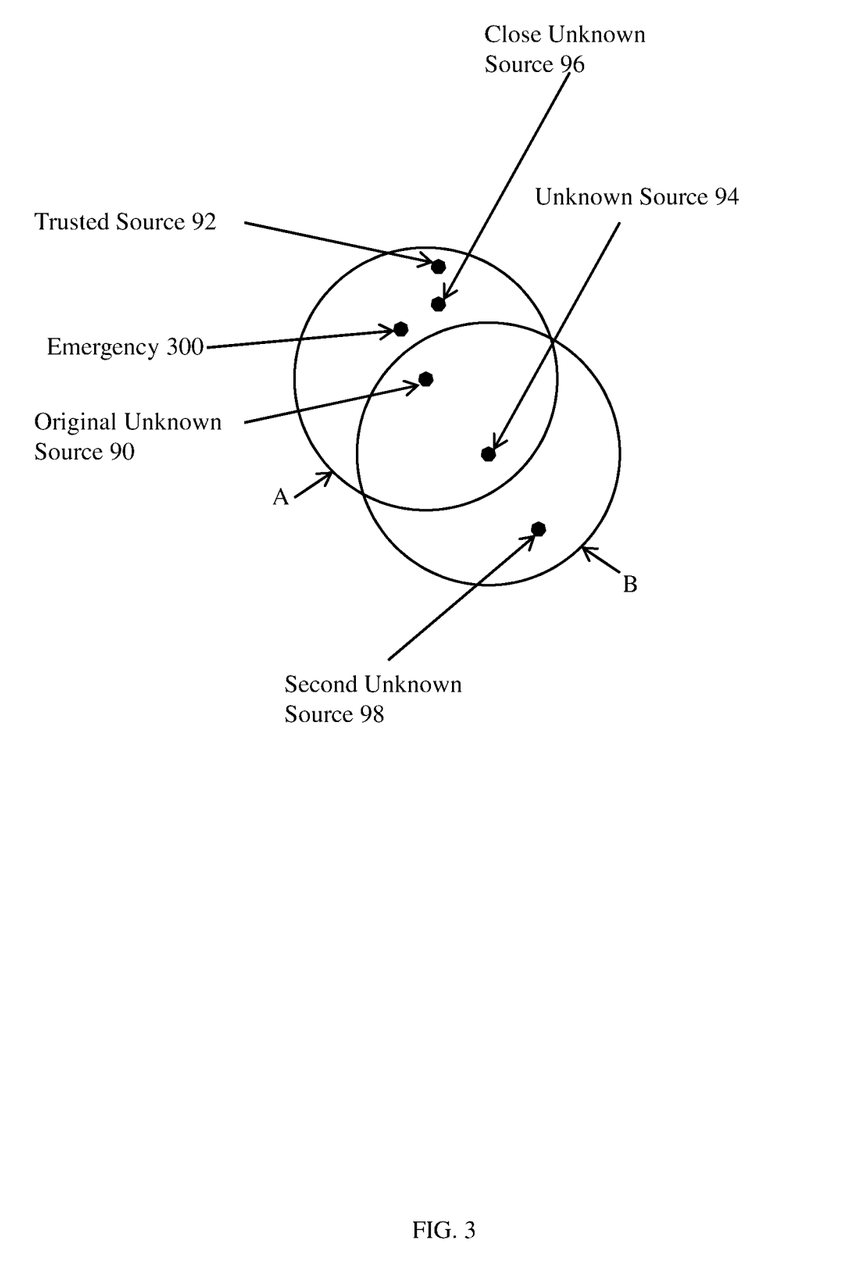
FIG. 3 shows an exemplary use in accordance with aspects of the invention.

FIG. 3 depicts an exemplary use scenario in accordance with embodiments of the invention. In aspects, a report of an emergency 300 is received from the original unknown source 90. In aspects, based on receiving the report of the emergency 300, the determining module 72 determines whether the original unknown source 90 is listed in the trusted source repository 102 or the untrusted source repository 104. In aspects, based on the original unknown source 90 being in the untrusted source repository 104, the selecting module 74 selects a second source (e.g., the trusted source 92 or the unknown source 94) at a location remote from the source. The selecting module 74 selects the second source from sources from within an area around the original unknown source 90 (e.g., within Venn circle A, where the original unknown source 90 is the center most point in the Venn Circle A).

In aspects, if the selecting module 74 selects the trusted source 92, the confirming module 76 confirms the report with the trusted source 92 via the user device 91 and emergency personnel are dispatched to the location of the emergency 300. In aspects, if the selecting module 74 selects the unknown source 94, the confirming module 76 confirms the report with the unknown source 94 via the user device 95 by: contacting the unknown source 94, confirming the report with the second unknown source 94, assigning a value to the information from the unknown source 94.

In aspects, the repeating module 78 performs the actions by the selecting module 74 and the confirming module 76 until the aggregate value of the information from multiple sources (e.g., the unknown source 94 and the second unknown source 98) exceeds the information trust level value. For example, if the value of the information from the unknown source 94 does not exceed the information trust level value, the selecting module 74 selects the second unknown source 98 within an area around the unknown source 94 (e.g., within Venn circle B, where the unknown source 94 is the center most point in the Venn Circle B). When the confirming module 76 confirms that the value of the information exceeds the information trust level value, emergency personnel are dispatched to the location of the emergency 300.

The selecting module 74 does not select the close unknown source 96 as the proximity between the original unknown source 90 and the close unknown source 96 is less than the proximity between the original unknown source 90 and the unknown source 94. By selecting the unknown source 94, possible improper collusion between the original unknown source 90 and the close unknown source 96 is avoided as the close unknown source 96 may transmit false reports to the source verification device 60 over the user device 97.

Figure 4:
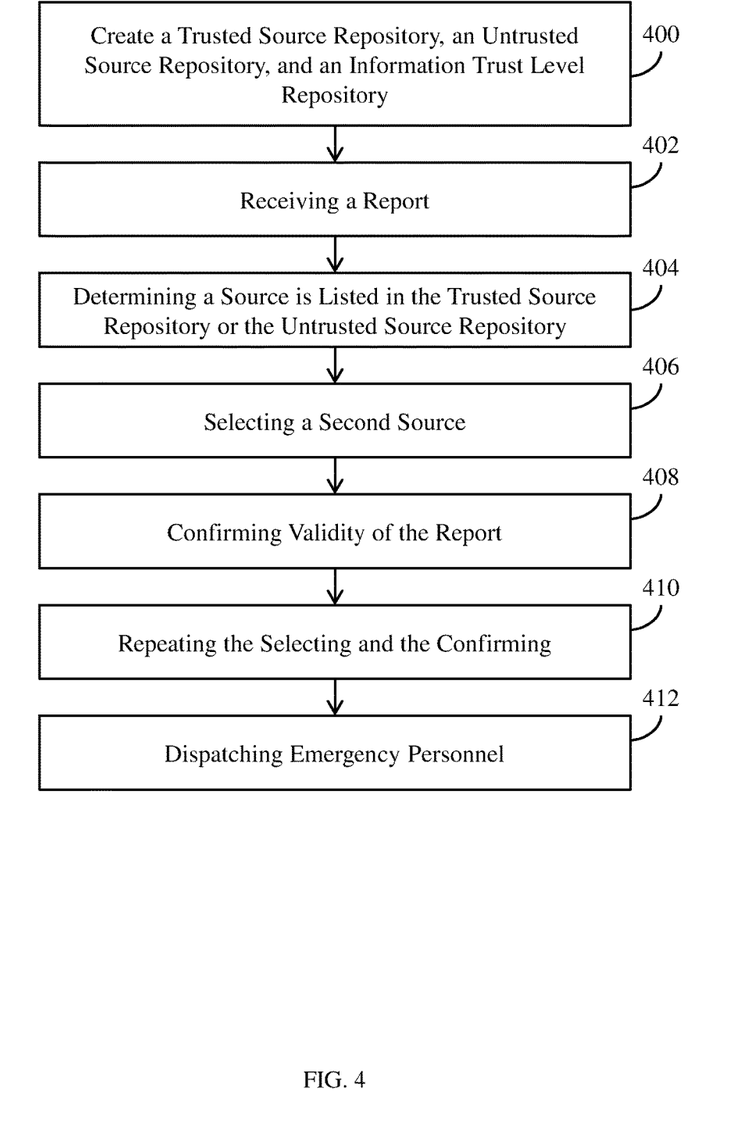
FIG. 4 illustrates a flowchart of steps of a method in accordance with aspects of the invention.

FIG. 4 shows a flowchart of steps of a method in accordance with aspects of the invention. The steps of the method may be implemented in the environment of FIGS. 2-3 and are described with reference to the elements and functions described in FIGS. 2-3. The flowchart of FIG. 4 illustrates the architecture, functionality, and operation of possible implementations of systems, methods, and computer program products according to various embodiments of the present invention.

At step 400, the source verification device 60 creates a trusted source repository 102, an untrusted source repository 104, and an information trust level repository 106. In aspects, the creating module 62 creates the trusted source repository 102 (e.g., a list of first responders, public safety officials, and trusted family members), the untrusted source repository 104 (e.g., a list of individuals who are not trusted to accurately report emergencies), and the information trust level repository 106 (e.g., a list of information trust level values for types of reports).

At step 402, the source verification device 60 receives a report of an emergency from a source. In aspects, the receiving module 70 receives the report from the source. For example the receiving module 70 may receive the report of an emergency 300 from the original unknown source 90. If the report is received by the original unknown source 90, mobile device performs vetting steps to: determine whether the source is listed in the trusted source repository 102 or the untrusted source repository 104, select a second source, and confirm the report from the first source with the second source.

At step 404, based on receiving the report at step 402, the source verification device 60 determines whether the source is listed in the trusted source repository 102 or the untrusted source repository 104. In aspects, the determining module 72 determines determine whether the source is listed in the trusted source repository 102 or the untrusted source repository 104 at step 404 based on information in the report (e.g., where the report include identifying information of the source).

For example, if the original unknown source 90 is not in the trusted source repository 102 or the untrusted source repository 104, the determining module 72 determines the location of the emergency and determines the information trust level value (e.g., a numerical as defined by the type of report and the profile information of the report) for the report from the original unknown source 90.

At step 406, based on determining whether the source is listed in the trusted source repository 102, the untrusted source repository 104, and the location of the emergency 300 at step 404, the source verification device 60 selects a second source. In aspects, the selecting module 74 selects a second source at step 406 based on determining determine whether the source is listed in the trusted source repository 102, the untrusted source repository 104, and the location of the emergency 300.

For example, if the original unknown source 90 is not listed in the trusted source repository 102 or the untrusted source repository 104, the selecting module 74 selects: a trusted source (e.g., the trusted source 92) close to the vicinity of the report and contacts the trusted source 92 via the user device 93 for confirmation of the report. In another example, if the original unknown source 90 is not listed in the trusted source repository 102 or the untrusted source repository 104 and no trusted sources are available, the selecting module 74 selects a second source (e.g., the unknown source 94) at a remote location from the original unknown source 90.

At step 408, based on receiving information from the second source at step 406, the source verification device 60 confirms the report with the second source. In aspects, the confirming module 76 confirms the report with the second source at step 408 based on receiving information from the second source. For example, based on the selecting module 74 selecting the unknown source 94, the confirming module 76 confirms the report with the unknown source 94 via user device 95 by automatic verification or formal verification.

After the report is confirmed with the unknown source 94, the confirming module 76 assigns a value to the information in the report (e.g., a numerical value as defined by the type of report, the location of the report, profile information for the type of report, size of the emergency in the report, and number of people affected by the emergency in the report, etc.). If the value assigned to the information in the report from the unknown source 94 exceeds the information trust level value determined by the determining module 72 at step 404, the report is considered verified and the source verification device 60 skips to step 412 and emergency personnel are dispatched to the location of the emergency in the report.

At step 410, based on the information in the report from the unknown source 94 not exceeding the information trust level value at step 408, the source verification device 60 repeats the selecting and the confirming until the aggregate value of the information from multiple sources exceeds the information trust level value. In aspects, the repeating module 78 repeats the selecting and the confirming until the aggregate value of the information from multiple sources exceeds the information trust level value. If the aggregate value of the information from multiple sources exceeds the information trust level value, emergency personnel are dispatched to the location of the emergency at step 412.

For example, if the value of the information in the report from the unknown source 94 does not exceeds the information trust level value, the repeating module 78 repeats the selecting step 406 to select another unknown source (e.g., the second unknown source 98) and repeats the confirming step 408 to confirm the report from original unknown source 90 with the second unknown source 98. If the aggregate value of the information from the unknown source 94 and the second unknown source 98 exceeds the information trust level value, emergency personnel are dispatched to the location of the emergency.

In embodiments, a service provider could offer to perform the processes described herein. In this case, the service provider can create, maintain, deploy, support, etc., the computer infrastructure that performs the process steps of the invention for one or more customers. These customers may be, for example, any business that requires device access.

In still another embodiment, the invention provides a computer-implemented method. In this case, a computer infrastructure, such as computer system 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
   receiving, by a computing device, a report from a first source;
   determining, by the computing device, the first source is listed in a source repository based on receiving the report, the source repository being an untrusted source repository;
   selecting, by the computing device, a second source at a location remote from the first source based on the first source being listed in the source repository, the selecting the second source being based on proximity of the second source to the first source;
   confirming, by the computing device, the report from the first source based on information received from the second source;
   repeating, by the computing device, the selecting and the confirming until a value of information in the report from the second source exceeds an information trust level value for the report, the information trust level value for the report being based on a type of report and profile information for the type of report:
   determining the location of the first source based on the first source being listed in the untrusted source repository; and
   selecting an area around the first source and selecting the second source from a plurality of second sources within the area around the first source, the selected second source being one of the plurality of second sources that is farthest away from the first source.

2. The method of claim 1, wherein the first source is an unknown source.

3. The method of claim 1, wherein the confirming the report is based on automatic verification.

4. The method of claim 3, wherein the confirming the report is based on formal verification.

5. The method of claim 4, wherein the value of information in the report from the second source is based on the type of report, a location of the report, profile information for the type of report, size of an emergency in the report, and number of people affected by the emergency in the report.

6. The method of claim 5, further comprising dispatching emergency in response to the value to information in the report from the second source exceeding the information trust level value.

7. A computer program product comprising a computer readable storage medium having program instructions embodied therewith, the program instructions executable by a computer device to cause the computer device to:
   receive a report from a first user device of a first source and determine the first source is listed in a source repository based on receiving the report, the source repository being an untrusted source repository;
   assign an information trust level value to the report from the first source based on receiving the report, the information trust level value for the report being based on a type of report and profile information for the type of report;
   select a second user device of a second source at a location remote from the user device of the first source based on assigning the information trust level value to the report from the first source, the selecting the second user device of the second source being based on proximity of the second source to the first source;
   assign an information value to information from the second source based on receiving information from the second source;
   confirm the report with the second user device of the second source based on determining the information value exceeds the information trust level value;
   determine the location of the first source based on the first source being listed in the untrusted source repository; and
   select an area around the first source and select the second source from a plurality of second sources within the area around the first source, the selected second source being one of the plurality of second sources that is farthest away from the first source.

8. The computer program product of claim 7, wherein the information value is based on the type of report, a location of the report, profile information for the type of report, size of an emergency in the report, and number of people affected by the emergency in the report.

9. The computer program product of claim 7, further comprising:
selecting a third source based on determining the information value does not exceed the information trust level value;
assigning a second information value to information from the third source based on receiving information from the third source;
confirming the report with the third source based on an aggregate value of the information value and the second information value exceeds the information trust level value.

10. The computer program product of claim 9, wherein the second information value is based on the type of report, a location of the report, profile information for the type of report, size of an emergency in the report, and number of people affected by the emergency in the report.

11. A system comprising:
a CPU, a computer readable memory and a computer readable storage medium associated with a computing device;
program instructions to receive a report from an unknown source at a location and determine the unknown source is listed in a source repository based on receiving the report, the source repository being an untrusted source repository;
program instructions to determine other unknown sources near the location;
program instructions to select a second unknown source from the other unknown sources, the selecting the second unknown source being based on proximity of the second unknown source to the first unknown source;
program instructions to determine whether information from the second unknown source exceeds an information trust level value, the information trust level value being based on a type of the report and profile information for the type of the report;
program instructions to repeat the selecting until information from a number of unknown sources exceeds the information trust level value;
program instructions to determine the location of the unknown source based on the unknown source being listed in the untrusted source repository: and
program instructions to select an area around the unknown source and select the second unknown source from the other unknown sources within the area around the unknown source, the selected second source being one of the other unknown sources that is farthest away from the unknown source,
wherein the program instructions are stored on the computer readable storage medium for execution by the CPU via the computer readable memory.

12. The system of claim 11, wherein the information trust level value is further based on a location of the report, size of an emergency in the report, and number of people affected by the emergency in the report.

13. The system of claim 11, further comprising checking a social connection of the unknown source and the second unknown source.

14. The system of claim 13, further comprising selecting a third unknown source based on the social connection of the unknown source and the second unknown source.

* * * * *